United States Patent [19]

Sekimura

[11] Patent Number: 4,560,240
[45] Date of Patent: Dec. 24, 1985

[54] LIQUID CRYSTAL DEVICE WITH ANTI-REFLECTION FUNCTION IN ELECTRODE

[75] Inventor: Nobuyuki Sekimura, Kawasaki, Japan

[73] Assignee: Canon Kabushiki Kaisha, Tokyo, Japan

[21] Appl. No.: 435,955

[22] Filed: Oct. 22, 1982

[30] Foreign Application Priority Data

Oct. 30, 1981 [JP] Japan ................. 56-175116
Oct. 30, 1981 [JP] Japan ................. 56-175117

[51] Int. Cl.⁴ .................. G02F 1/13; G02F 1/135
[52] U.S. Cl. ................... 350/336; 350/339 F; 350/339 D; 350/339 R; 350/347 V
[58] Field of Search .......... 252/299.01; 350/334, 350/336, 338, 339 R, 339 D, 339 F, 340, 341, 347 R, 347 V, 348

[56] References Cited

U.S. PATENT DOCUMENTS

| | | |
|---|---|---|
| 3,736,047 | 5/1973 | Gelber ................. 350/338 |
| 3,814,501 | 6/1974 | Schindler ............. 350/338 |
| 4,068,923 | 1/1978 | Toida ................... 350/339 R |
| 4,185,894 | 1/1980 | Hilton ................. 350/338 |
| 4,201,453 | 5/1980 | Kobale ................ 350/340 |
| 4,240,710 | 12/1980 | Kozaki ............... 350/339 R |
| 4,248,502 | 2/1981 | Bechteler ........... 350/339 R |
| 4,385,805 | 5/1983 | Channin ............. 350/336 |
| 4,408,837 | 10/1983 | Kozaki ............... 350/336 |

FOREIGN PATENT DOCUMENTS 0614798 12/1979 Switzerland ................. 350/338

*Primary Examiner*—Teddy S. Gron
*Assistant Examiner*—Catherine S. Kilby
*Attorney, Agent, or Firm*—Fitzpatrick, Cella, Harper & Scinto

[57] ABSTRACT

A liquid crystal device in which the liquid crystal is sandwiched between electrode-substrates. At least one of the electrode-substrates includes a transparent electrode having a refractive index changing successively in the direction of thickness to reduce the light to be reflected by the transparent electrode.

4 Claims, 8 Drawing Figures

LIQUID CRYSTAL DEVICE WITH ANTI-REFLECTION FUNCTION IN ELECTRODE

BACKGROUND OF THE INVENTION

1. Field of the Invention

The present invention relates to a liquid crystal device adapted for use as a display element or a shutter element, for example.

2. Description of the Prior Art

There are already known various types of liquid crystal devices, such as dynamic scattering mode type, twisted nematic type, guest-host type etc., but in any type a voltage is applied across a pair of electrodes sandwiching the liquid crystal.

In any type of the liquid crystal device at least one of the electrodes is composed of a transparent electrode, which tends to show strong light reflection due to the high refractive index of the material constituting said transparent electrode. Such reflection hinders proper observation and significantly deteriorates the quality and contrast of the display. Also one may confuse the operative state and inoperative state of the device if such reflection is strong. A proposal for reducing such reflection from the transparent electrode pattern has been made in Japanese Patent Application Laid-open No. 30117/1981. According to this proposal, the transparent substrate is provided thereon with a transparent electrode of a determined thickness with a uniform refractive index. It is however difficult, with such structure, to sufficiently avoid the reflection over the entire visible wavelength range from 400 to 700 m$\mu$.

SUMMARY OF THE INVENTION

It is an object of the present invention to provide a liquid crystal device in which the light reflection from the transparent electrode pattern is satisfactorily reduced over the visible wavelength range.

In order to achieve the above-mentioned object, there is provided, according to the present invention, a liquid crystal device in which at least one of the electrode-substrates is composed of a transparent substrate and a transparent electrode formed thereon and having a refractive index changing continuously or stepwise in the direction of thickness thereof.

In an embodiment of the present invention to be explained later, satisfactory prevention of the reflection is achieved by establishing such relation that $n_0 < n_1$, $n_2 < n_1$ and $n_{LC} < n_2$, wherein $n_0$, $n_1$, $n_2$ and $n_{LC}$ are refractive indexes respectively of the transparent substrate, transparent electrode at a side thereof facing the transparent substrate, transparent electrode at the other side facing the liquid crystal, and liquid crystal.

In the liquid crystal device of the present invention, a surface of said transparent electrode facing the liquid crystal may be so treated as to orient the liquid crystal, without affecting the function of preventing the reflection.

DESCRIPTION OF THE PREFERRED EMBODIMENTS

Figure 1:
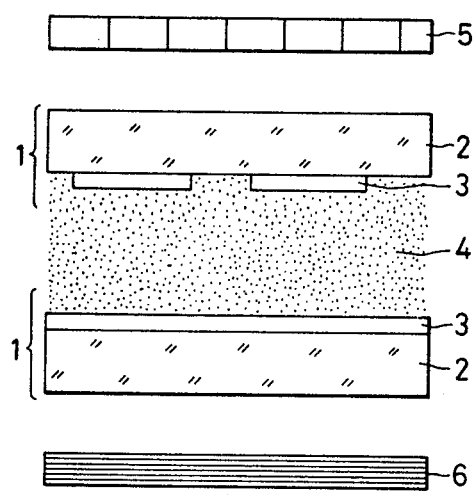
FIG. 1 is a schematic view showing an embodiment of the liquid crystal device of the present invention.

FIG. 1 is a cross-sectional view of a liquid crystal device utilizing a twisted nematic type liquid crystal and embodying the present invention, wherein each electrode-substrate 1 is composed of a transparent substrate 2 and a transparent electrode 3. The electrode 3 has a refractive index successively changing in the refractive index. Liquid crystal 4 is sandwiched between a pair of said transparent electrodes 3, and the substrates are in turn disposed between a pair of linearly polarizing plates 5,6. These polarizing plates are so disposed that the polarizing axes thereof are mutually perpendicular. In FIG. 1, the spacers and sealants for maintaining the liquid crystal in place are omitted for the purpose of simplicity.

Figure 2:
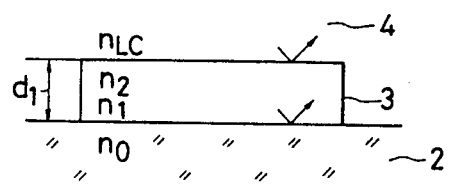
FIG. 2 is a schematic view showing the structure of an electrode-substrate to be used in the liquid crystal device of the present invention.

FIG. 2 shows the details of the electrode-substrate shown in FIG. 1, wherein $n_0$ is the refractive index of the transparent substrate 2, $n_1$ that of transparent electrode at a side thereof facing said transparent substrate, $n_2$ that of transparent electrode at the other side facing the liquid crystal, and $n_{LC}$ that of liquid crystal.

Figure 3A:
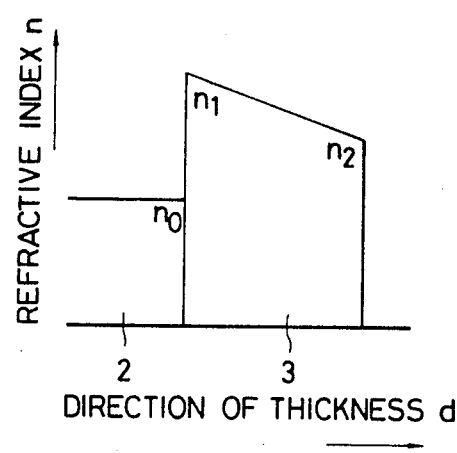
FIGS. 3A and 3B illustrate examples of the changing refractive index of the transparent electrode to be used in the liquid crystal device of the present invention.
Figure 3B:
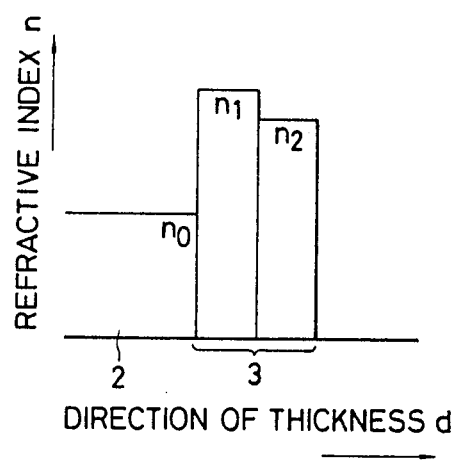

Said transparent electrode 3 has a refractive index changing in the direction of thickness thereof, either continuously as shown in FIG. 3A or stepwise in at least two steps as shown in FIG. 3B.

The optical thickness of the transparent electrode is expressed by $$\int_0^{d_1} n(d) \cdot \Delta d,$$

wherein $d_1$ is the geometrical thickness of said transparent electrode, and $n(d)$ represents the distribution of the refractive index in the direction of thickness $d_1$ and becomes a stepped function in case the refractive index is changed stepwise.

Figure 4:
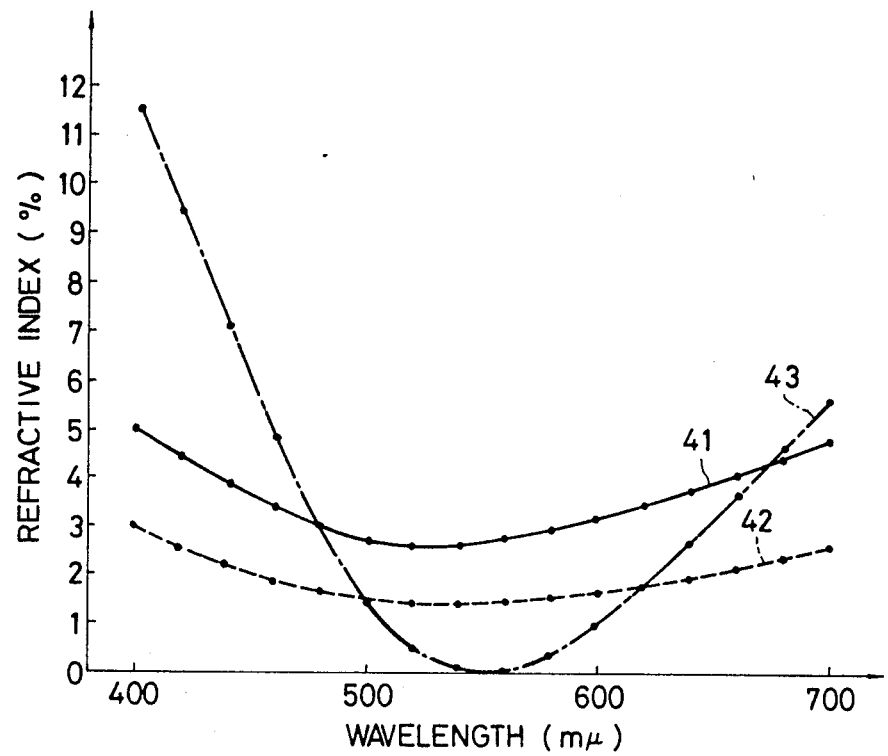
FIG. 4 is a chart showing the spectral reflectances of the electrode-substrate of the liquid crystal device according to the present invention as compared with that of a conventional electrode-substrate.

FIG. 4 shows spectral reflectance characteristics, visible wavelength range, of examples of the electrode-substrate of the liquid crystal device according to the present invention, wherein a curve 41 corresponds to conditions of $n_0 = 1.5$, $n_1 = 2.2$, $n_2 = 1.6$, $n_{LC} = 1.5$ and $$\int_0^{d_1} n(d) \cdot \Delta d = 290 \, m\mu,$$

while a curve 42 corresponds to conditions of $n_0 = 1.5$, $n_1 = 2.0$, $n_2 = 1.6$, $n_{LC} = 1.5$ and $$\int_0^{d_1} n(d)\cdot \Delta d = 290\ m\mu.$$

A curve 43 shows the spectral reflectance characteristic of an electrode-substrate, according to the aforementioned Japanese Patent Application Laid-open No. 30117/1981, wherein a transparent substrate of a refractive index of 1.5 is provided thereon with a transparent electrode of a refractive index of 2.2 and of a thickness of 275 mμ.

As will be seen from FIG. 4, the reflectance R as provided by the present invention (curves 41 and 42) less varies over the visible wavelength range and is generally lower as compared with that of the conventional structure (curve 43).

Further, it has been found that the reflection from the transparent electrode can be particularly satisfactorily prevented if the optical thickness of said transparent electrode is so selected as to satisfy the following relation:

$$0.4N\lambda_0 \leq \int_0^{d_1} n(d)\cdot \Delta d \leq 0.65N\cdot \lambda_0 \qquad (1)$$

wherein $\lambda_0$ is the design wavelength and N is an arbitrary positive integer.

Figure 5:
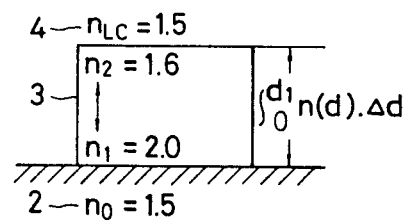
FIG. 5 is a schematic view showing an example of the electrode-substrate of the liquid crystal device according to the present invention.

FIG. 5 is a schematic view showing another example of the electrode-substrate of the liquid crystal device according to the present invention, wherein a transparent substrate 2 of a refractive index of 1.5 is provided with a transparent electrode 3 having refractive indexes of 2.0 and 1.6 respectively at the sides thereof facing the transparent substrate and the liquid crystal, and the electrode-substrate is used in combination with a liquid crystal 4 of a refractive index of 1.5.

Figure 6:
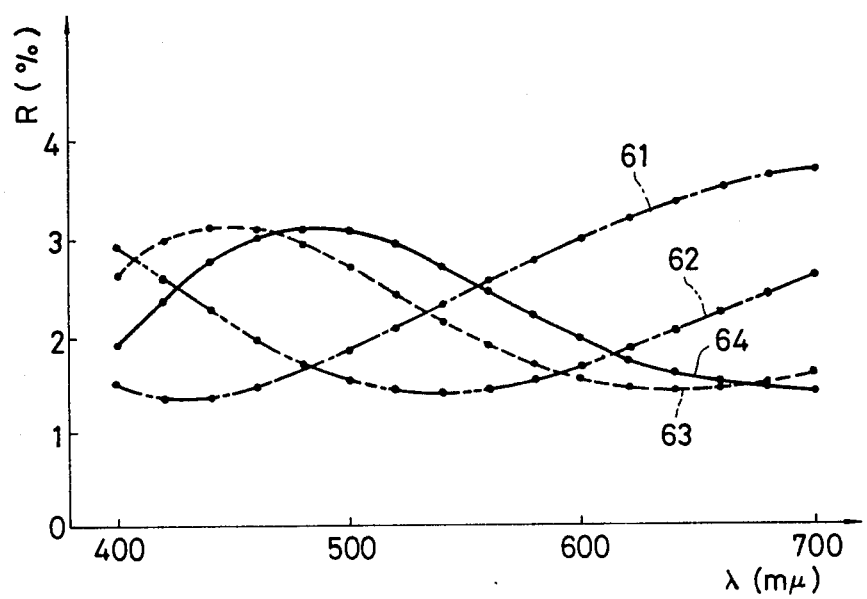
FIGS. 6 and 7 are charts each showing the spectral reflectance of the electrode-substrate shown in FIG. 5, in the visible wavelength range.

FIG. 6 shows the spectral reflectance characteristics examples according to the refractive indexes shown in FIG. 5 and according to the relation (1), for a design wavelength $\lambda_0=580$ mμ and N=1 and for different optical thicknesses $$\int_0^{d_1} n(d)\cdot \Delta d$$

of the transparent electrode as shown in Table 1:

TABLE 1

| Curve | Optical thickness |
|---|---|
| 61 | 232 mμ |
| 62 | 290 |
| 63 | 348 |
| 64 | 377 |

Figure 7:
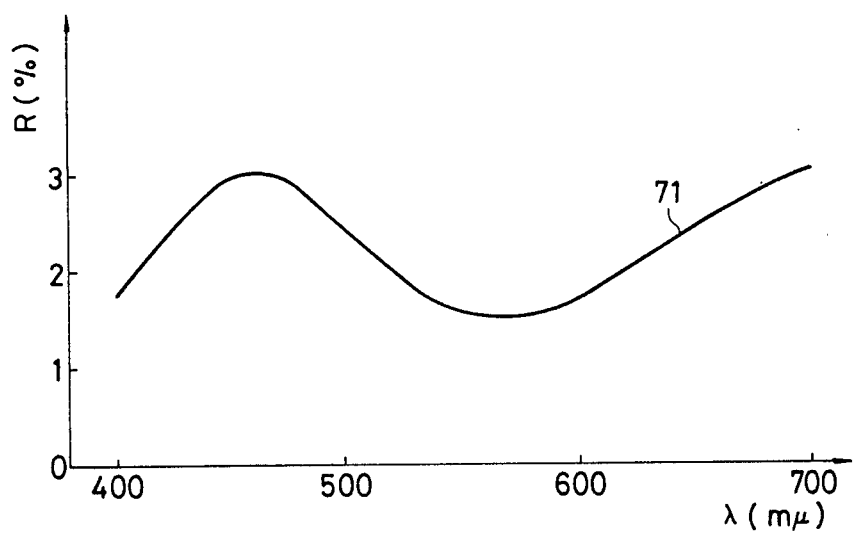

Also FIG. 7 shows the spectral reflectance characteristic of an example according to the refractive indexes shown in FIG. 5 and according to the relation (1), for a design wavelength $\lambda_0=580$ mμ and N=2 and for an optical thickness of 580 mμ for the transparent electrode.

As will be seen from FIGS. 6 and 7, the reflectance is generally lower than 3% over the visible wavelength range with less dependence on wavelength, of the order of 1.5%.

In the above-described liquid crystal device, the transparent substrate 2 may be surfacially provided with a protective coating without any practical change in the reflectance if said protective coating material is composed of transparent inorganic substance of a refractive index same as or close to the refractive index $n_0$ of said transparent substrate. Consequently, in case the transparent substrate is composed of glass containing alkali ions detrimental to the performance of the liquid crystal, it is preferable to coat the surface of said glass substrate with a transparent in organic substance having a refractive index substantially equal to that of said substrate. As an example, in case the transparent substrate is composed of glass of a refractive index of 1.52, it is preferable to coat the surface thereof with $SiO_2$, which is a transparent inorganic substance with a refractive index of ca. 1.48.

As examples of the materials usable in the present invention, the transparent substrate 2 can be composed of glass such as soda lime glass, barium crown glass, barium flint glass, dense barium crown glass, flint glass or dense flint glass, or a plastic material such as polymethyl methacrylate (acrylic resin), polyester, polystyrene or polycarbonate. Also the transparent electrode 3 can be composed of $In_2O_3$, $SnO_2$ or $In_2O_3$ added with $SnO_2$, and the liquid crystal 4 can be of nematic type.

The transparent electrode 3 can be subjected, without affecting the desirable optical performance, to an orienting treatment such as rubbing in order to orient the liquid crystal.

Said transparent electrode 3 can be formed for example by vacuum deposition, sputtering, ion plating, dip coating, spinner coating, chemical vapor deposition etc.

Changing the refractive index of the transparent electrode 3 in the direction of thickness thereof can be attained for example by:

(i) changing the temperature of substrate or changing the composition of remaining gas, during the vacuum deposition process;

(ii) injecting desired ions into the thin layer;

(iii) changing the temperature of substrate while effecting the spinner coating process: or (iv) changing the temperature of substrate while effecting the chemical vapor deposition process.

As explained in the foregoing, the liquid crystal device of the present invention is capable of significantly reducing the reflectance of the electrode pattern. Also decreasing the refractive index of the transparent electrode from a side facing the transparent substrate to the other side facing the liquid crystal results in a lower density of the transparent electrode at the side facing the liquid crystal, thereby facilitating the orienting treatment such as rubbing and thus enhancing the orientation of the liquid crystal.

What is claimed is:

1. A liquid crystal device with an anti-reflection function comprising:

a liquid crystal; and two electrode-substrates so positioned as to sandwich said liquid crystal therebetween, at least one of said electrode-substrates including a transparent substrate and a transparent electrode provided thereon and facing said liquid crystal, said transparent electrode comprising a single layer and having a refractive index which decreases in the direction of thickness thereof from the side of said transparent substrate to the side of said liquid crystal to reduce the light in the visible wavelength range to be reflected at the surface thereof.

2. A liquid crystal device according to claim 1, wherein the device satisfies the following relation:

$$n_0 < n_1 \text{ and } n_{LC} < n_2$$

where $n_0$ is the refractive index of said transparent substrate, $n_1$ is the refractive index of said transparent electrode at a side thereof facing said transparent substrate, $n_2$ is that at the other side facing said liquid crystal, and $n_{LC}$ is the refractive index of said liquid crystal.

3. A liquid crystal device according to claim 1 or 2, wherein the optical thickness $$\int_0^{d_1} n(d) \cdot \Delta d$$

of said transparent electrode satisfies the following relation:

$$0.4 N \lambda_0 \leq \int_0^{d_1} n(d) \cdot \Delta d \leq 0.65 N \cdot \lambda_0$$

where $\lambda_0$ is the design wavelength and $N$ is an arbitrary positive integer.

4. A liquid crystal device according to claim 1, further comprising means for orienting said liquid crystal and disposed on said transparent electrode at its side facing said liquid crystal.

* * * * *

UNITED STATES PATENT AND TRADEMARK OFFICE
CERTIFICATE OF CORRECTION

PATENT NO. : 4,560,240
DATED : December 24, 1985
INVENTOR(S) : NOBUYUKI SEKIMURA It is certified that error appears in the above-identified patent and that said Letters Patent is hereby corrected as shown below:

Column 2, line 48, change "$0^{d_1}n(d)\cdot \Delta d,$" to --$\int_0^{d_1} n(d)\cdot \Delta d,$--; and
line 64, change "$0^{d_1}n(d)\cdot$" to --$\int_0^{d_1} n(d)\cdot$--.

Column 3, line 3, change "$0^{d_1}n(d)\cdot$" to --$\int_0^{d_1} n(d)\cdot$--;
line 14, change "less varies" to --varies less--;
line 24, change "$0^{d_1}n(d)\cdot$" to --$\int_0^{d_1} n(d)\cdot$--;
line 38, after "characteristics" insert --of--; and
line 45, change "$0^{d_1}n(d)\cdot$" to --$\int_0^{d_1} n(d)\cdot$--.

Column 4, line 1, change "materical" to --material--; and
line 8, change "in organic" to --inorganic--.

Column 6, line 3, change "$0^{d_1}n(d)\cdot \Delta d$" to --$\int_0^{d_1} n(d)\cdot \Delta$--; and
line 10, change "$0^{d_1}$" to --$\int_0^{d_1}$--.

Signed and Sealed this

Ninth Day of September 1986

[SEAL]

Attest:

DONALD J. QUIGG

Attesting Officer  Commissioner of Patents and Trademarks